US010117111B2

(12) United States Patent
Jobe et al.

(10) Patent No.: US 10,117,111 B2
(45) Date of Patent: *Oct. 30, 2018

(54) SYSTEM AND METHOD FOR SIMULATING A LAND MOBILE RADIO SYSTEM

(71) Applicant: E.F. Johnson Company, Irving, TX (US)

(72) Inventors: Marshall Jobe, Fort Worth, TX (US); Arindam Roy, Plano, TX (US)

(73) Assignee: E.F. JOHNSON COMPANY, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,007

(22) Filed: Dec. 22, 2015

(65) Prior Publication Data
US 2016/0112882 A1    Apr. 21, 2016

Related U.S. Application Data

(63) Continuation of application No. 13/278,641, filed on Oct. 21, 2011, now Pat. No. 9,252,982.
(Continued)

(51) Int. Cl.
*H04W 16/22* (2009.01)
*H04W 16/18* (2009.01)
(Continued)

(52) U.S. Cl.
CPC ............. *H04W 16/22* (2013.01); *H04L 12/66* (2013.01); *H04L 41/145* (2013.01);
(Continued)

(58) Field of Classification Search
CPC .............................. H04L 12/66; H04W 84/042
(Continued)

(56) References Cited

U.S. PATENT DOCUMENTS 4,870,408 A    9/1989    Zdunek et al.
5,214,789 A    5/1993    George
(Continued)

FOREIGN PATENT DOCUMENTS

DE    4434372 A1    3/1996
DE    10104926 A1    11/2001
(Continued)

OTHER PUBLICATIONS

Notice of Allowance dated Sep. 22, 2015 of U.S. Appl. No. 13/278,641.
(Continued)

*Primary Examiner* — Douglas B Blair
*Assistant Examiner* — Joseph M Cousins
(74) *Attorney, Agent, or Firm* — Foley & Lardner LLP

(57) ABSTRACT

The present disclosure provides a system and method for simulating a land mobile radio system having a plurality of radio sites. The simulation system may comprise an IP network providing an IP-based interface between components within the system such as, for example, a first server designed to simulate one or more radio sites, a second server designed to simulate one or more subscriber units, and a controller interface for providing commands for controlling the simulated subscriber units. Each site in the first server may include one or more site applications each associated with an IP address, and each subscriber unit in the second server is associated with a plurality of IP addresses for communicating with the site applications over the IP network.

36 Claims, 7 Drawing Sheets

Related U.S. Application Data

(60) Provisional application No. 61/405,618, filed on Oct. 21, 2010.

(51) Int. Cl.
*H04L 12/24* (2006.01)
*H04L 12/66* (2006.01)
*H04L 29/12* (2006.01)
*H04W 84/04* (2009.01)

(52) U.S. Cl.
CPC ......... *H04L 61/2007* (2013.01); *H04W 16/18* (2013.01); *H04W 84/042* (2013.01)

(58) Field of Classification Search
USPC ....................................................... 709/203
See application file for complete search history.

(56) References Cited

U.S. PATENT DOCUMENTS

| | | |
|---|---|---|
| 5,293,638 A | 3/1994 | Sasuta et al. |
| 5,420,909 A | 5/1995 | Ng et al. |
| 5,594,940 A | 1/1997 | Peterson et al. |
| 5,850,444 A | 12/1998 | Rune |
| 5,901,341 A | 5/1999 | Moon et al. |
| 6,028,846 A | 2/2000 | Cain |
| 6,119,010 A | 9/2000 | Labedz |
| 6,134,514 A | 10/2000 | Liu et al. |
| 6,134,515 A | 10/2000 | Skogby |
| 6,141,347 A | 10/2000 | Shaughnessy et al. |
| 6,199,032 B1 | 3/2001 | Anderson |
| 6,336,035 B1 | 1/2002 | Somoza et al. |
| 6,374,115 B1 | 4/2002 | Barnes et al. |
| 6,545,995 B1 | 4/2003 | Kinnunen et al. |
| 6,571,082 B1 | 5/2003 | Rahman et al. |
| 6,618,696 B1 | 9/2003 | Dean et al. |
| 6,744,746 B1 | 6/2004 | Bartelme |
| 6,754,224 B1 | 6/2004 | Murphy |
| 6,771,703 B1 | 8/2004 | Oguz et al. |
| 6,771,966 B1 | 8/2004 | Chow |
| 6,813,593 B1 | 11/2004 | Berger |
| 6,822,947 B2 | 11/2004 | Sawyer et al. |
| 6,898,188 B1 | 5/2005 | Hamami |
| 6,934,555 B2 | 8/2005 | Silva et al. |
| 6,940,838 B1 | 9/2005 | Stead |
| 6,941,457 B1 | 9/2005 | Gundavelli et al. |
| 6,985,735 B2 | 1/2006 | Gustafsson |
| 6,996,510 B1 | 2/2006 | Reilly et al. |
| 7,006,467 B2 | 2/2006 | Anton, Jr. et al. |
| 7,035,643 B2 | 4/2006 | Slawitschka et al. |
| 7,056,217 B2 | 6/2006 | Pelkey et al. |
| 7,075,893 B1 | 7/2006 | Mlinarsky et al. |
| 7,080,147 B2 | 7/2006 | Wang et al. |
| 7,113,791 B2 | 9/2006 | Lepschy et al. |
| 7,120,432 B2 | 10/2006 | Voyer |
| 7,133,679 B2 | 11/2006 | Zhu |
| 7,184,790 B2 | 2/2007 | Dorenbosch et al. |
| 7,218,620 B2 | 5/2007 | Lee |
| 7,221,660 B1 | 5/2007 | Simonson et al. |
| 7,231,330 B2 | 6/2007 | Hernandez-Mondragon et al. |
| 7,236,779 B2 | 6/2007 | Lahav et al. |
| 7,246,055 B1 | 7/2007 | Singh |
| 7,251,456 B2 | 7/2007 | Chiu |
| 7,263,471 B2 | 8/2007 | Barbaresi et al. |
| 7,277,395 B2 | 10/2007 | Rosen et al. |
| 7,308,268 B2 | 12/2007 | Barbosa da Torre et al. |
| 7,324,588 B2 | 1/2008 | Green et al. |
| 7,379,740 B2 | 5/2008 | Da Torre et al. |
| 7,386,435 B2 | 6/2008 | Sutinen et al. |
| 7,403,779 B2 | 7/2008 | De Cambray-Mathan |
| 7,433,692 B2 | 10/2008 | De Santis et al. |
| 7,486,636 B2 | 2/2009 | Francalanci et al. |
| 7,564,805 B1 | 7/2009 | Cortez et al. |
| 7,596,377 B2 | 9/2009 | Barberis et al. |
| 7,636,339 B2 | 12/2009 | Shaffer et al. |
| 7,639,988 B2 | 12/2009 | Abusch-Magder et al. |
| 7,664,846 B2 | 2/2010 | Tiruthani |
| 7,672,669 B2 | 3/2010 | Alexander et al. |
| 7,698,121 B2 | 4/2010 | Steenkiste et al. |
| 7,729,287 B2 | 6/2010 | Griffiths |
| 7,738,407 B2 | 6/2010 | Chow et al. |
| 7,747,248 B2 | 6/2010 | Escott |
| 7,747,249 B2 | 6/2010 | Guo et al. |
| 7,760,660 B2 | 7/2010 | Conway |
| 7,764,633 B2 | 7/2010 | Marque-Pucheu |
| 7,765,093 B2 | 7/2010 | Li et al. |
| 7,770,068 B2 | 8/2010 | Drees |
| 7,783,463 B2 | 8/2010 | Herro |
| 7,796,983 B2 | 9/2010 | Pao et al. |
| 7,809,659 B1 | 10/2010 | Paiz |
| D636,361 S | 4/2011 | Frandsen et al. |
| 7,929,475 B2 | 4/2011 | Simonson et al. |
| 7,970,425 B2 | 6/2011 | Balachandran et al. |
| 8,059,574 B2 | 11/2011 | Roy et al. |
| 8,160,076 B1 | 4/2012 | Aggarwal et al. |
| 8,255,684 B2 | 8/2012 | Benshetler et al. |
| 8,352,223 B1 * | 1/2013 | Anthony ............. G06F 17/5036 382/128 |
| 8,483,114 B2 | 7/2013 | Roy et al. |
| 8,694,774 B2 | 4/2014 | Benshetler et al. |
| 9,148,421 B2 | 9/2015 | Benshetler et al. |
| 9,252,982 B2 | 2/2016 | Jobe et al. |
| 9,516,475 B2 | 12/2016 | Roy et al. |
| 9,763,260 B2 | 9/2017 | Bane et al. |
| 9,774,386 B2 | 9/2017 | Roy et al. |
| 9,800,460 B2 | 10/2017 | Roy et al. |
| 2001/0010689 A1 | 8/2001 | Awater et al. |
| 2002/0114302 A1 | 8/2002 | McDonald et al. |
| 2002/0155839 A1 | 10/2002 | Nisbet |
| 2003/0016834 A1 | 1/2003 | Blanco et al. |
| 2003/0058858 A1 | 3/2003 | Berlyoung et al. |
| 2003/0063569 A1 | 4/2003 | Kalliokulju et al. |
| 2003/0086405 A1 | 5/2003 | Silva et al. |
| 2003/0095510 A1 | 5/2003 | Dorenbsoch |
| 2004/0070515 A1 | 4/2004 | Burkley et al. |
| 2004/0132453 A1 | 7/2004 | Gabriel et al. |
| 2004/0170149 A1 * | 9/2004 | Lee ....................... H04W 24/06 370/338 |
| 2004/0214577 A1 | 10/2004 | Borst et al. |
| 2004/0214583 A1 | 10/2004 | Graham et al. |
| 2005/0165919 A1 | 7/2005 | Qian et al. |
| 2005/0174986 A1 | 8/2005 | Emond et al. |
| 2005/0180448 A1 | 8/2005 | Kobayashi |
| 2005/0198359 A1 | 9/2005 | Basani et al. |
| 2005/0233751 A1 | 10/2005 | Bardwell |
| 2005/0267928 A1 | 12/2005 | Anderson et al. |
| 2005/0281208 A1 | 12/2005 | Dorenbosch et al. |
| 2005/0282590 A1 | 12/2005 | Haparnas |
| 2006/0140125 A1 | 6/2006 | Ottinger et al. |
| 2006/0160562 A1 | 7/2006 | Davis et al. |
| 2006/0205398 A1 * | 9/2006 | Seckendorf ........... H04W 24/06 455/423 |
| 2006/0211443 A1 | 9/2006 | Wegman |
| 2006/0217120 A1 | 9/2006 | Annunziato et al. |
| 2006/0217122 A1 | 9/2006 | Levit et al. |
| 2006/0240814 A1 | 10/2006 | Cutler |
| 2006/0262800 A1 | 11/2006 | Martinez et al. |
| 2006/0274659 A1 | 12/2006 | Ouderkirk |
| 2006/0282247 A1 | 12/2006 | Brennan et al. |
| 2007/0014263 A1 | 1/2007 | Ferrato et al. |
| 2007/0019769 A1 * | 1/2007 | Green .................. H04W 24/00 375/360 |
| 2007/0061442 A1 | 3/2007 | Kan et al. |
| 2007/0072619 A1 | 3/2007 | Wei et al. |
| 2007/0104121 A1 | 5/2007 | Shaffer et al. |
| 2007/0147296 A1 | 6/2007 | Barbaresi et al. |
| 2007/0147357 A1 | 6/2007 | Pelletier et al. |
| 2007/0160181 A1 | 7/2007 | Barbaresi et al. |
| 2007/0242670 A1 | 10/2007 | Simonson et al. |
| 2007/0259692 A1 | 11/2007 | Venkatachalam |
| 2007/0263597 A1 | 11/2007 | Morinaga et al. |
| 2007/0263798 A1 | 11/2007 | Dewing et al. |
| 2007/0293159 A1 | 12/2007 | Etelapera |
| 2008/0056466 A1 | 3/2008 | Nishimura |

(56) References Cited

U.S. PATENT DOCUMENTS

| | | |
|---|---|---|
| 2008/0076425 A1 | 3/2008 | Khetawat et al. |
| 2008/0114239 A1 | 5/2008 | Randall et al. |
| 2008/0123650 A1 | 5/2008 | Bhaskar |
| 2008/0144644 A1 | 6/2008 | Allan et al. |
| 2008/0161006 A1 | 7/2008 | Ferrato et al. |
| 2008/0270098 A1* | 10/2008 | Sarkkinen .......... H04B 17/0087 703/13 |
| 2008/0293402 A1 | 11/2008 | Rajan et al. |
| 2009/0024845 A1 | 1/2009 | Benshetler et al. |
| 2009/0028059 A1 | 1/2009 | Barbaresi et al. |
| 2009/0052339 A1 | 2/2009 | Spring et al. |
| 2009/0112569 A1* | 4/2009 | Angus ................ B64F 5/0045 703/22 |
| 2009/0140949 A1 | 6/2009 | Stratis et al. |
| 2009/0175209 A1 | 7/2009 | Roy et al. |
| 2009/0185502 A1 | 7/2009 | Sung et al. |
| 2009/0254330 A1* | 10/2009 | Goria ................ H04L 41/0233 703/13 |
| 2009/0305709 A1 | 12/2009 | Panico et al. |
| 2010/0020735 A1 | 1/2010 | Roy et al. |
| 2010/0035619 A1 | 2/2010 | Panico et al. |
| 2010/0105399 A1 | 4/2010 | Akerlund |
| 2010/0141565 A1 | 6/2010 | Frandsen et al. |
| 2010/0162036 A1 | 6/2010 | Linden et al. |
| 2010/0169446 A1 | 7/2010 | Linden et al. |
| 2010/0178925 A1 | 7/2010 | Bernini et al. |
| 2010/0227583 A1* | 9/2010 | Roy ................... H04L 12/1818 455/404.1 |
| 2010/0232299 A1 | 9/2010 | Conway |
| 2010/0303033 A1 | 12/2010 | Shahar et al. |
| 2011/0034170 A1 | 2/2011 | Zhong et al. |
| 2012/0002588 A1 | 1/2012 | Roy et al. |
| 2012/0035904 A1* | 2/2012 | Seckendorf ............. B21D 5/00 703/21 |
| 2012/0039201 A1 | 2/2012 | Roy et al. |
| 2012/0083307 A1 | 4/2012 | Roy et al. |
| 2012/0102097 A1 | 4/2012 | Jobe et al. |
| 2012/0331289 A1 | 12/2012 | Benshetler et al. |
| 2013/0072165 A1 | 3/2013 | Rondeau et al. |
| 2013/0114493 A1* | 5/2013 | Olivier ............. H04L 29/12292 370/312 |
| 2013/0165134 A1 | 6/2013 | Touag et al. |
| 2013/0215819 A1 | 8/2013 | Ji et al. |
| 2013/0294323 A1 | 11/2013 | Roy et al. |
| 2013/0337822 A1 | 12/2013 | Rubin et al. |
| 2014/0195801 A1 | 7/2014 | Benshetler et al. |
| 2014/0273916 A1 | 9/2014 | Roy et al. |
| 2014/0357234 A1 | 12/2014 | Sullivan |
| 2015/0057040 A1 | 2/2015 | Kuehner |
| 2015/0326471 A1 | 11/2015 | Anandan et al. |
| 2016/0014818 A1 | 1/2016 | Reitsma et al. |
| 2016/0036624 A1 | 2/2016 | Roy et al. |
| 2016/0100294 A1 | 4/2016 | Ruelke et al. |
| 2016/0135207 A1 | 5/2016 | Bane et al. |
| 2017/0311336 A1 | 10/2017 | Bane et al. |
| 2018/0054350 A1 | 2/2018 | Roy et al. |

FOREIGN PATENT DOCUMENTS

| | | |
|---|---|---|
| DE | 10061550 A1 | 6/2002 |
| DE | 102007008196 A1 | 8/2008 |
| EP | 1317158 A1 | 6/2003 |
| EP | 1335617 A1 | 8/2003 |
| EP | 1534032 A1 | 5/2005 |
| EP | 1534033 A1 | 5/2005 |
| EP | 2136582 A1 | 12/2009 |
| GB | 2427796 | 1/2007 |
| WO | WO-99/052314 A1 | 10/1999 |
| WO | WO-2005/006798 A1 | 1/2005 |
| WO | WO-2007/060808 A1 | 5/2007 |
| WO | WO-2007/078467 A2 | 7/2007 |
| WO | WO-2007/136270 A1 | 11/2007 |
| WO | WO-2008/014818 A1 | 2/2008 |
| WO | WO-2008/064706 A1 | 6/2008 |
| WO | WO-2008/151464 A1 | 12/2008 |
| WO | WO-2009/069507 A1 | 6/2009 |

OTHER PUBLICATIONS

Response to Advisory Action dated Feb. 9, 2015 in U.S. Appl. No. 13/278,641.

Advisory Action and Applicant-Initiated Interview Summary, dated Jan. 29, 2015 in U.S. Appl. No. 13/278,641.

Response to Final Office Action, dated Jan. 5, 2015 in U.S. Appl. No. 13/278,641.

Final Office Action, dated Oct. 8, 2014, in U.S. Appl. No. 13/278,641.

Response to Office Action, dated Sep. 18, 2014, in U.S. Appl. No. 13/278,641.

Office Action, dated Apr. 22, 2014, in U.S. Appl. No. 13/278,641.

Alcober, J. et al., "Multi-site Model and Simulation of Trunking Systems," 5th IEEE International Conference on Universal Personal Communications, 1996, pp. 236-239, Universitat Politecnica de Catalunya, Barcelona.

Baker, D. et al., "The Design and Simulation of a Mobile Radio Network with Distributed Control," IEEE Journal on Selected Areas in Communications, Jan. 1984, pp. 226-237, vol. 2, Issue 1.

Chiani, M. et al., "A Semi-Analytical Approach for Performance Evaluation of TCP-IP Based Mobile Radio Links," Proceedings of Global Telecommunications Conference, 2000, pp. 937-942, vol. 2, IEEE, Piscataway, NJ.

Chrapkowski, A. et al., "Mobile Trunked Radio System Design and Simulation," 41st IEEE Vehicular Technology Conference, 1991, pp. 245-250, IEEE, New York, NY.

D'Aria, G. et al., "Simulation and Performance of the Pan-European Land Mobile Radio System," IEEE Transactions on Vehicular Technology, May 1992, pp. 177-189, vol. 41, Issue 2, IEEE.

Farrell, T.C., et al., "A Computer Simulation Analysis of Conventional and Trunked Land Mobile Radio for a System with a Small Number of User Groups," Military Communications Conference, Oct. 15-18, 1989, pp. 923-927, vol. 3.

Gladstone, K.J. et al., "Computer Simulation of Multipath Fading in the Land Mobile Radio Environment," Electronic Circuits and Systems, IEE Proceedings, Pt. G., Dec. 1980, pp. 323-330, vol. 127, Issue 6.

Harada, H. et al., "Simulation and Software Radio for Mobile Communications," book, 2002, pp. 335-364.

Liebl, G. et al., "A Real-Time Simulation Environment for IP-Traffic Over Cellular Links," 6th World Multiconference on Systemics, Cybernetics and Informatics Proceedings, 2002, pp. 1-6, vol. 4.

Liu, W. et al., "Parallel Simulation Environment for Mobile Wireless Networks," Proceedings of the 1996 Winter Simulation Conference, 1996, pp. 605-612, Coronado, CA.

Loo, C., "A Statistical Model for a Land Mobile Satellite Link," IEEE Transactions on Vehicular Technology, Aug. 1985, pp. 122-127, vol. 34, Issue 3, IEEE Vehicular Technology Society.

Nehme, G. et al., "A Simulation Study of High-Capacity Cellular Land-Mobile Radio-Communication Systems," Can. Elec. Eng. Journal, Jan. 1982, pp. 36-39, vol. 7, Issue 1, EIC, Canada.

Onoe, Y. et al., "Cooperation of Multiple Simulators for Mobile IP Networks," 17th International Conference on Advanced Information Networking and Applications, AINA 2003, pp. 367-372, IEEE, Piscataway, NJ.

Patzold, M. et al., "A Deterministic Digital Simulation Model for Suzuki Processes with Application to a Shadowed Rayleigh Land Mobile Radio Channel," IEEE Transactions on Vehicular Technology, May 1996, pp. 318-331, vol. 45, No. 2, IEEE.

Perennou, T. et al., "Two-Stage Wireless Network Emulation," Broadband Satellite Communication Systems and the Challenges of Mobility, 2005, pp. 181-190, vol. 169, IFIP International Federation for Information Processing.

Prasad, M.V. et al., "A Comparison of Land Mobile Radio Prediction Methods in Indian Rural Zones," IEEE International Conference on Personal Wireless Communications, 2005, pp. 217-219, IEEE.

(56) References Cited

OTHER PUBLICATIONS

Short, J. et al., "Mobile Wireless Network System Simulation," Wireless Networks, 1995, pp. 451-467, vol. 1, Issue 4, J.C. Baltzer AG, Science Publishers.
Simon, G. et al., "Simulation-based Optimization of Communication Protocols for Large-Scale Wireless Sensor Networks," 2003 IEEE Aerospace Conference Proceedings, 2003, pp. 1-8, IEEE.
Smith, J. I., "A Computer Generated Multipath Fading Simulation for Mobile Radio," IEEE Transactions on Vehicular Technology, Aug. 1975, pp. 39-40, vol. 24, Issue 3, IEEE.
Zeng, X. et al., "GloMoSim: A Library for Parallel Simulation of Large-scale Wireless Networks," Parallel and Distributed Simulation, 1998, pp. 154-161, Dept of Computer Science, Los Angeles, CA.
Zhi-Yong, S. et al., "Design and Simulation of Trunking Communication System in TD-SCDMA Network Based on SIP Protocol," 2009 International Symposium on Information Engineering and Electronic Commerce, May 2009, pp. 481-485, IEEE.
Telecommunications Industry Association (TIA) with Electronic Industries Alliance (EIA), TIA/EIA Standard: Project 25—Trunking Control Channel Messages New Technology Standards Project Digital Radio Technical Standards (ANSI/TIA/EIA-102.AABC), May 2000, Telecommunications Industry Association (TIA), Arlington, VA (150 pages).
Telecommunications Industry Association (TIA) with Electronic Industries Alliance (EIA), TIA/EIA Standard: Project 25—Trunking Control Channel Messages, Addendum 1, SNDCP Trunking Control Channel Messages (ANSI/TIA/EIA-102.AABC-1), Sep. 2001, Telecommunications Industry Association (TIA), Arlington, VA (11 pages).
Telecommunications Industry Association (TIA) with Electronic Industries Alliance (EIA), TIA Standard: Project 25—Trunking Control Channel Messages, Addendum 2 Multiband Operations, New Technology Standards Project Digital Radio Technical Standards (ANSI/TIA-102.AABC-2), Dec. 2002, Telecommunications Industry Association (TIA), Arlington, VA (39 pages).
Telecommunications Industry Association (TIA) with Electronic Industries Alliance (EIA), TIA/EIA Telecommunications Systems Bulletin, APCO Project 25—Trunking Overview (TSB102.AABA), Apr. 1995, Telecommunications Industry Association (TIA), Arlington, VA (12 pages).
U.S. Appl. No. 60/950,868, filed Jul. 19, 2007; first-named inventor: Benshetler.
U.S. Appl. No. 60/950,870, filed Jul. 19, 2007; first-named inventor: Benshetler.
U.S. Appl. No. 60/963,131, filed Aug. 2, 2007; first-named inventor: Benshetler.
U.S. Appl. No. 61/790,588, filed Mar. 15, 2013; first-named inventor: Arindam Roy.
U.S. Appl. No. 62/076,473, filed Nov. 6, 2014; first-named inventor: Bane.
Office Action dated Oct. 15, 2010 issued in U.S. Appl. No. 11/937,963 (15 pages).
1st Notice of Allowance dated Mar. 4, 2011 issued in U.S. Appl. No. 11/937,963 (5 pages).
2nd Notice of Allowance dated Jul. 1, 2011 issued in U.S. Appl. No. 11/937,963 (7 pages).
Office Action dated Dec. 17, 2010 issued in U.S. Appl. No. 11/940,936 (12 pages).
Final Office Action dated Jul. 1, 2011 issued in U.S. Appl. No. 11/940,936 (16 pages).
Office Action dated Sep. 19, 2012 in U.S. Appl. No. 13/251,895.
Response to Non-Final Office Action, dated Dec. 19, 2012, in U.S. Appl. No. 13/251,895.
Notice of Allowance dated Mar. 12, 2013 in U.S. Appl. No. 13/251,895.
Office Action dated May 20, 2013 in U.S. Appl. No. 13/595,981.
Response to Office Action, dated Oct. 21, 2013, in U.S. Appl. No. 13/595,981.
Terminal Disclaimer dated Oct. 21, 2013, in U.S. Appl. No. 13/595,981.
Notice of Allowance dated Nov. 19, 2013 in U.S. Appl. No. 13/595,981.
Office Action dated Mar. 27, 2015, in U.S. Appl. No. 13/937,005.
Response to Office Action, dated Aug. 27, 2015, in U.S. Appl. No. 13/937,005.
Final Office Action dated Sep. 16, 2015, in U.S. Appl. No. 13/937,005.
Response to Final Office Action, dated Nov. 16, 2015, in U.S. Appl. No. 13/937,005.
Terminal Disclaimer dated Dec. 2, 2015, in U.S. Appl. No. 13/937,005.
Notice of Allowance dated Jan. 13, 2016 in U.S. Appl. No. 13/937,005.
Notice of Allowance dated Apr. 19, 2016 in U.S. Appl. No. 13/937,005.
Notice of Allowance dated Jul. 29, 2016 in U.S. Appl. No. 13/937,005.
Office Action dated Dec. 10, 2014 in U.S. Appl. No. 14/200,812.
Response to Office Action, dated Apr. 8, 2015, in U.S. Appl. No. 14/200,812.
Terminal Disclaimer dated Apr. 8, 2015, in U.S. Appl. No. 14/200,812.
Notice of Allowance dated May 26, 2015 in U.S. Appl. No. 14/200,812.
Office Action dated Oct. 2, 2015, in U.S. Appl. No. 14/217,150.
Response to Office Action, dated Mar. 31, 2016, in U.S. Appl. No. 14/217,150.
Office Action dated Jul. 11, 2016, in U.S. Appl. No. 14/217,150.
Response to Office Action, dated Oct. 11, 2016, in U.S. Appl. No. 14/217,150.
Response to Advisory Action, dated Oct. 31, 2016, in U.S. Appl. No. 14/217,150.
Notice of Allowance dated Dec. 14, 2016, in U.S. Appl. No. 14/217,150.
Notice of Allowance dated Jul. 11, 2017, in U.S. Appl. No. 14/217,150.
Office Action dated Feb. 21, 2017 in U.S. Appl. No. 14/815,095.
Notice of Allowance dated Jun. 21, 2017 in U.S. Appl. No. 14/815,095.
Preliminary Amendment dated May 10, 2016, in U.S. Appl. No. 14/935,270.
Notice of Allowance dated Apr. 4, 2017, in U.S. Appl. No. 14/935,270.
Copending U.S. Appl. No. 15/494,391, filed Apr. 21, 2017; first-named inventor: Arindam Roy.
Office Action dated Jun. 5, 2017 in U.S. Appl. No. 15/494,391.
Response to Office Action dated Jun. 5, 2017 in U.S. Appl. No. 15/494,391, filed Sep. 5, 2017.
Copending U.S. Appl. No. 15/641,747, filed Jul. 5, 2017; first-named inventor: Bane.
U.S. Appl. No. 15/641,747, Office Action dated Oct. 18, 2017.
Copending U.S. Appl. No. 15/786,476, filed Oct. 17, 2017, first-named inventor: Roy.
U.S. Appl. No. 15/786,476, Office Action dated Feb. 26, 2018.
U.S. Appl. No. 15/494,391, filed Apr. 21, 2017, Distributed Simulcast Architecture.
U.S. Appl. No. 15/641,747, filed Jul. 5, 2017, System and Method for Dynamic Channel Allocation.
U.S. Appl. No. 15/786,476, filed Oct. 17, 2017, Interoperability Gateway for Land Mobile Radio System.
U.S. Appl. No. 15/494,391, Final Office Action dated Dec. 22, 2017, 23 pgs.
U.S. Appl. No. 15/494,391, Non-Final Office Action dated Jul. 26, 2018, 12 pgs.

* cited by examiner

SYSTEM AND METHOD FOR SIMULATING A LAND MOBILE RADIO SYSTEM

CROSS-REFERENCE TO RELATED APPLICATIONS

This application is a continuation of U.S. patent application Ser. No. 13/278,641, entitled "System and Method for Simulating a Land Mobile Radio System," filed Oct. 21, 2011, which claims priority to U.S. Provisional Patent Application Ser. No. 61/405,618, entitled "System and Method for Simulating a Land Mobile Radio System," filed Oct. 21, 2010, all of which are incorporated herein by reference for all purposes.

FIELD OF THE INVENTION

The present invention relates generally to Land Mobile Radio (LMR) systems and, more specifically, to a system and method for simulating an LMR system.

BACKGROUND

Land Mobile Radio (LMR) systems are deployed by organizations requiring instant communication between geographically dispersed and mobile personnel. Typical users of LMR systems include police departments, fire departments, medical personnel, security personnel, EMS, and the military.

Current LMR systems are typically tested in a controlled testing environment before being deployed in the LMR system's intended geographical setting. Generally, the controlled testing environment requires the building and testing of equipment that is intended to be used in the field for the LMR system that is being tested. Therefore, for the testing of a typical LMR system, the controlled testing environment includes, at least, equipment for each land mobile radio site (otherwise referred to herein as a "site" or "radio site") in the system, a network connecting all the sites, and subscriber units, or radios, to be tested on each site. The equipment for each site in the system typically includes a control channel, one or more traffic channels, a site controller, and a digital signal processing (DSP) interface. Current testing practices require the equipment for an LMR system to be built and tested. Therefore, as larger LMR systems are tested, more sites are required, and the testing becomes increasingly expensive due to the time and budget requirements involved in providing and testing additional equipment for the system.

SUMMARY OF THE INVENTION

The present disclosure provides a system and method for simulating a land mobile radio system having a plurality of radio sites. In one embodiment, the simulation system comprises an internet protocol (IP) network providing an IP-based interface between a first server designed to simulate radio sites, a second server designed to simulate one or more subscriber units, and a controller interface for providing commands for controlling the simulated subscriber units. Each site simulated by the first server includes one or more site applications each associated with an IP address, and each subscriber unit simulated by the second server is associated with a plurality of IP addresses for communicating with the site applications over the IP network.

In another embodiment, the simulation system comprises an IP network providing an IP-based interface between one or more non-simulated land mobile radio sites, a first server designed to simulate additional radio sites, a second server designed to simulate subscriber units, and a controller interface for providing commands for controlling the simulated subscriber units. Each simulated radio site of the first server includes one or more site applications each associated with an IP address, and each simulated subscriber unit of the second server is associated with a plurality of IP addresses. In this embodiment, the non-simulated land mobile radio sites communicate with non-simulated subscriber units using radio frequency (RF) communication, whereas the simulated subscriber units communicate with the simulated site applications over the IP network.

Another embodiment of the present disclosure provides a system for simulating a land mobile radio system, wherein the simulation system comprises an IP network providing an IP-based interface between one or more primary servers each designed to simulate a radio site, a secondary server designed to simulate subscriber units, and a controller interface for providing commands for controlling the simulated subscriber units. Each simulated radio site of each of the primary servers includes one or more simulated site applications each associated with an IP address, and each subscriber unit of the secondary server is associated with a plurality of IP addresses for communicating with the simulated site applications over the IP network. This embodiment may also include one or more non-simulated land mobile radio sites connected to the IP network, wherein the non-simulated land mobile radio sites communicate with non-simulated subscriber units using RF communication.

The present disclosure also provides a method for simulating the land mobile radio system by simulating radio sites connected over an IP network, associating an IP address with each of one or more site applications in communication with each radio site, associating subscriber units with at least one site application, and simulating the subscriber units communicating with the site applications over the IP network.

The present disclosure also provides a method for testing a land mobile radio system by simulating radio sites connected over an IP network, associating one or more site applications located within each radio site with an IP address, associating subscriber units with at least one site application, simulating the subscriber units communicating with the site applications over the IP network, and monitoring data packets communicated between the simulated subscriber units and the site applications. The disclosed method may be provided, for example, to test the software used to operate the land mobile radio system and/or to test the IP network capacity of the system.

The foregoing and other features and advantages of certain embodiments of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures, in which like reference numbers indicate similar parts, and in which.

DETAILED DESCRIPTION OF THE DRAWINGS

Figure 1:
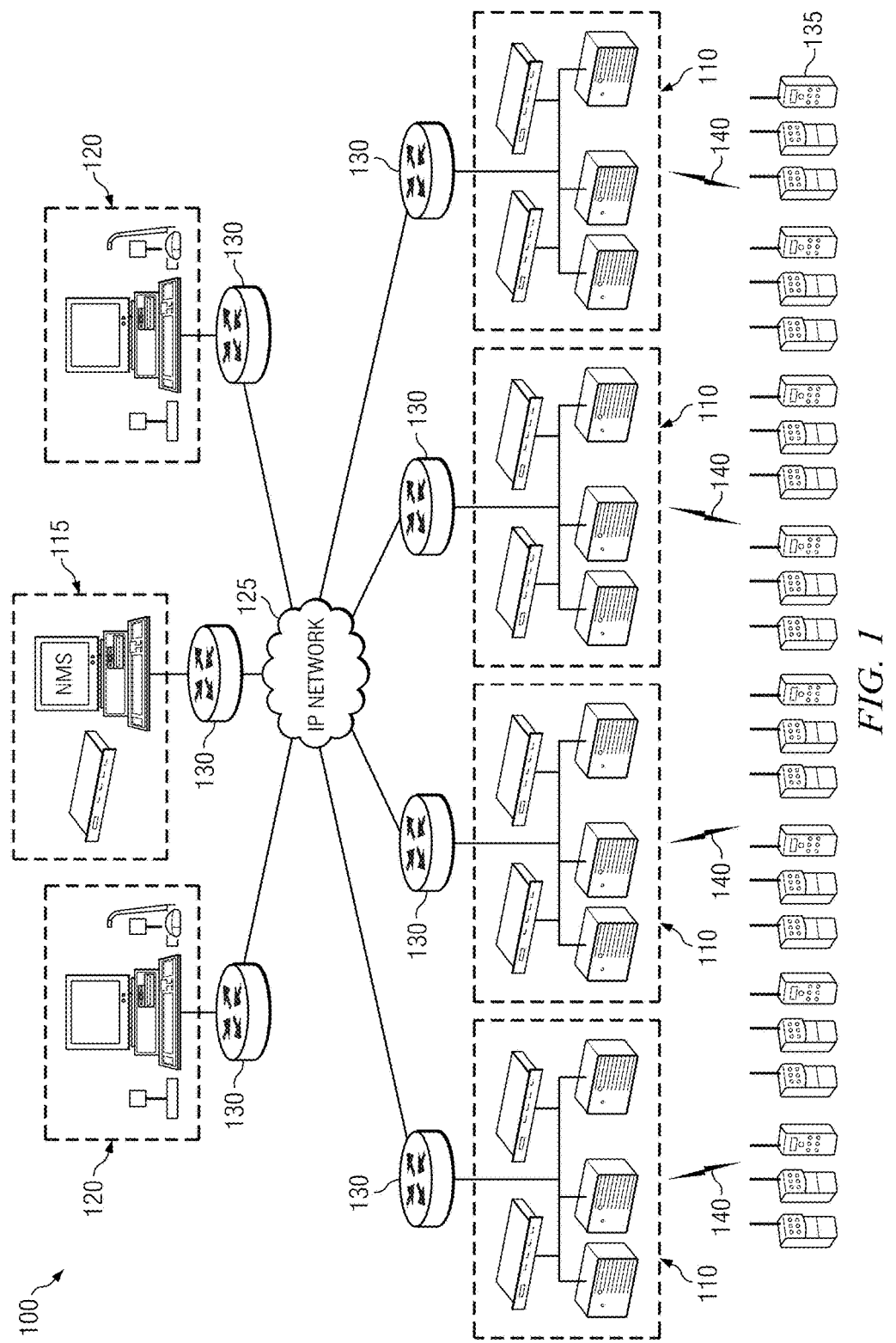
FIG. 1 is an illustration of an example embodiment of an LMR system testing environment.

Prior to being deployed in the field, LMR systems are generally built and tested in a controlled testing environment such as, for example, the example testing environment 100 illustrated in FIG. 1. As shown in FIG. 1, the LMR system built in the example testing environment 100 may comprise one or more radio sites 110, network management systems 115, and dispatch consoles 120 communicating through an IP network 125 using a series of switches and routers 130, wherein each radio site 110 communicates with subscriber units 135 via RF communication 140. It should be understood that a subscriber unit 135 may be physically located within communication range, geographical boundaries, or otherwise associated with one or more respective sites 110. In general, the testing environment 100 illustrated in FIG. 1 is provided to test the operation and capacity of the LMR system before the system is deployed for use in the field.

Figure 2:
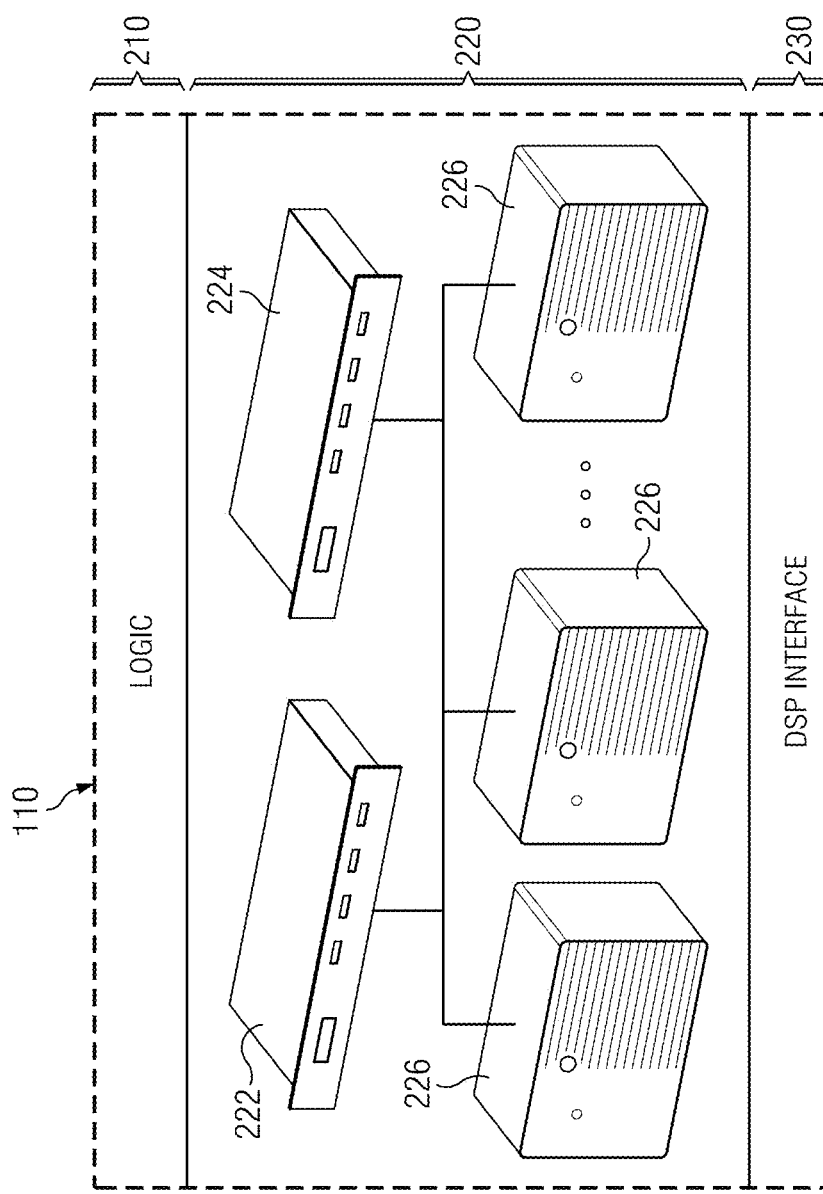
FIG. 2 is an illustration of an example embodiment of the components comprising one of the sites shown in FIG. 1.

FIG. 2 provides a more detailed illustration of an example embodiment of one of the sites 110 shown in FIG. 1, wherein each site 110 may include a logic layer 210, an application layer 220, and a DSP interface layer 230. The logic layer 210 comprises the software, or code, required to operate the site 110, and the application layer 220 provides the applications configured to execute the software to set-up and conduct calls as well as provide other general operational functionality of the site. The DSP interface layer 230 provides an RF-based interface operable to transceive data packets as RF signals between a site 110 and subscriber units 135. As illustrated in the example embodiment shown in FIG. 2, the application layer 220 comprises site applications such as, for example, a control channel 222, a site controller 224, and one or more traffic channels 226. Although the components of a site 110 are shown separately as layers in FIG. 2, it should be understood that they are not required to be segregated and, therefore, may be integrated as desired. For example, in some embodiments, the logic layer 210 may be implemented as software operating on one or more of the applications (222, 224, and 226) provided in the application layer 220.

As previously stated, the sites 110 and subscriber units 135 communicate via an RF-based interface provided by the DSP interface 230. Therefore, in order to test the capacity of an LMR system using the example testing environment 100 illustrated in FIG. 1, additional sites 110 and subscriber units 135 are added to the system, and diagnostic testing is performed to measure the effects of the additional sites 110 and subscriber units 135. However, the additional sites 110 and subscriber units 135 are expensive and, as a result, increase operating costs of testing such LMR systems. As such, the present disclosure provides a system and method for simulating an LMR system, wherein the simulated LMR system may be implemented in an existing LMR system, or in a controlled testing environment in lieu of certain components comprising the LMR system to potentially reduce the amount of equipment needed for testing the LMR system. The simulated LMR system may be implemented to provide efficient, dynamic testing at potentially reduced costs when compared to current testing practices.

Figure 3:
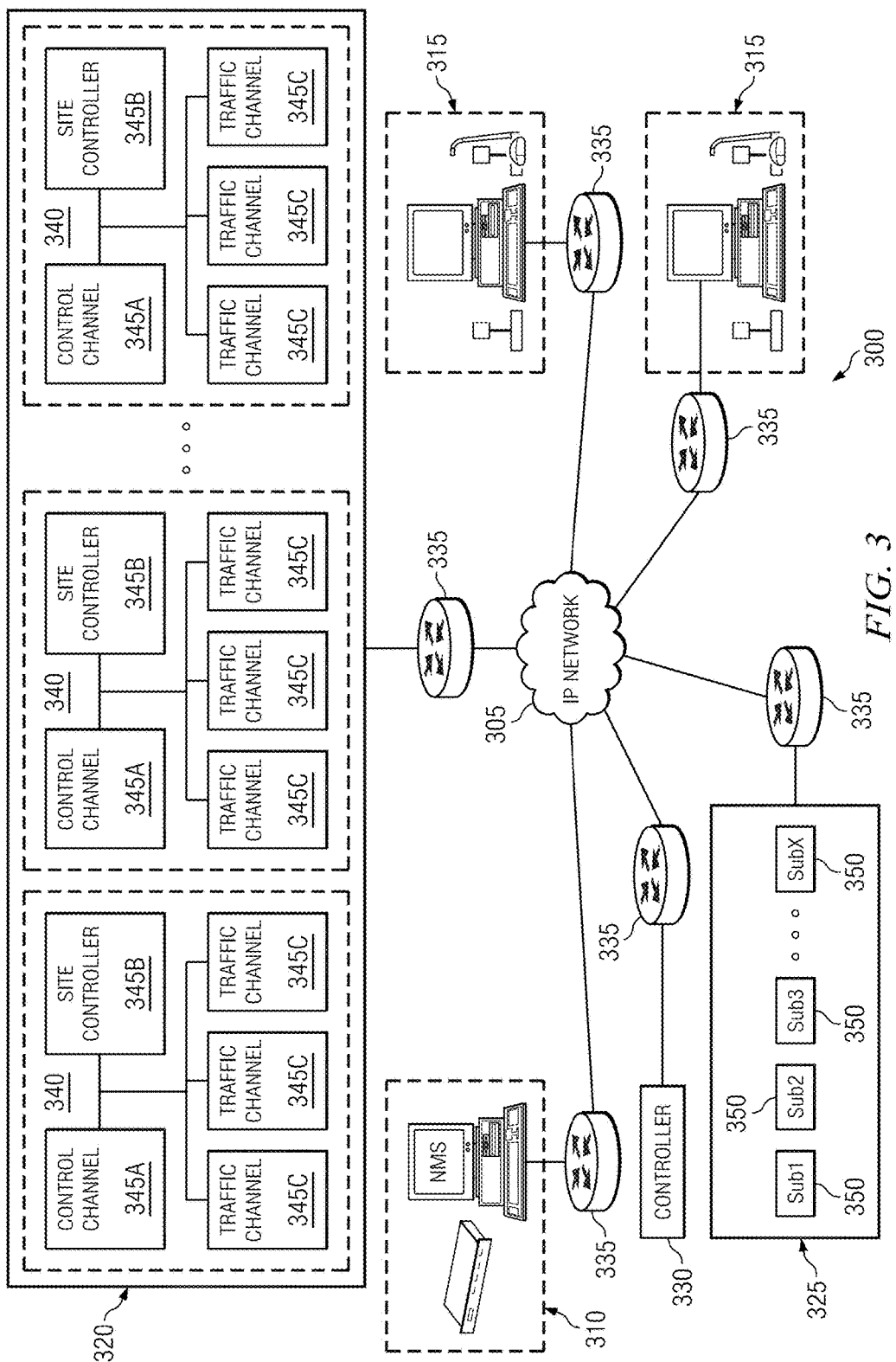
FIG. 3 is an illustration of an example embodiment of a system for simulating an LMR system.

FIG. 3 illustrates an example embodiment of the present disclosure, wherein a system 300 (otherwise referred to as "simulation system 300") for simulating an LMR system uses an IP-based interface (e.g., between subscriber units and sites) instead of an RF-based interface. As illustrated by the simulation system 300 shown in FIG. 3, an IP-based interface is provided by an IP network 305 connecting one or more network management systems (NMS) 310, dispatch consoles 315, a site server 320, a subscriber unit server 325, and a controller 330 through a series of switches and routers 335. In essence, referring briefly to FIG. 1, the RF-based interface 140 typically provided to facilitate communication between subscriber units 135 and sites 110 in a traditional LMR system (such as a trunking LMR system) is replaced by the IP-based interface provided by the IP network 305 as shown in FIG. 3. As such, components in the present disclosure that may typically be identified by a radio frequency or physical location in traditional, non-simulated LMR systems are now identified by an IP address in the system 300 provided by the present disclosure. Although the switches and routers 335 are shown separately in the accompanying figures, it should be understood that the switches and routers 335 may comprise part of the IP network 305 without departing from the scope of the present disclosure as defined by the claims below.

In general, the NMS 310 may be provided to configure the LMR system that is to be simulated in the system 300. It should be noted that although the NMS 310 may provide data that is used when configuring the simulation system 300, configuring the LMR system may be different from configuring the simulation system 300, which may generally be performed by the controller 330, as described in greater detail below. The NMS 310 may, in one embodiment, provide configuration data for subscriber units (simulated and/or non-simulated) operating on the LMR system, as well as storage of general information used by the LMR system. Such configuration data may include, for example, subscriber unit registration data, listings of subscriber units registered with the LMR system, user group data, talk group data, mobility management data, and any other data that may be associated with a network management system for an LMR system.

The dispatch consoles 315 shown in FIG. 3 are generally operable to communicate with land mobile radio sites and other dispatch consoles 315 to direct communication between each of the sites. In certain embodiments, the dispatch consoles 315 may communicate with one or more physical LMR sites (not shown) and/or one or more simulated LMR sites 340 explained in greater detail below.

In accordance with an embodiment of the present disclosure, the site server 320 is operable to simulate one or more simulated land mobile radio sites 340, wherein each simulated site 340 comprises one or more site applications 345 each of which may be associated with an IP address. The site applications 345 are provided to simulate functionality that is typically provided by traditional, non-simulated land mobile radio sites. Examples of the simulated functionality provided by the site applications 345 may include call setup, call routing, mobility management, channel allocation, subscriber unit validation, registration, talkgroup affiliation, multicast broadcasting of voice data, etc. However, instead of using RF communication, the embodiment of the simulation system 300 illustrated in FIG. 3 provides simulated functionality over the IP network 305 using IP addresses as explained in greater detail below. Additionally, because the site applications 345 are simulated, they may be designed to provide additional functionality that is not typically provided by non-simulated land mobile radio sites. Such additional functionality may include, for example, generating voice data packets and providing feedback regarding performance and diagnostics of the system 300.

When reference is made to the site applications illustrated in FIG. 3, reference number "345" is used when referring generally to all applications located within a site 340. However, in some embodiments, each site 340 may be comprised of one or more site applications 345, as discussed above and illustrated in FIG. 3. Therefore, when reference is made to a specific site application illustrated in FIG. 3, reference number "345A" is used to refer to a control channel application, reference number "345B" is used to refer to a site controller application, and reference number "345C" is used to refer to a traffic channel application. Although FIG. 3 only illustrates control channel, site controller, and traffic channel applications (345A, 345B, and 345C, respectively), it should be understood that other applications may be included in each simulated site 340. The applications 345 are illustrated separately in FIG. 3 in order to identify the functionality performed by the applications 345 comprising each simulated site 340; however, in some embodiments, functionality provided by multiple applications 345 may be combined into a single application 345.

The subscriber unit server 325 simulates subscriber units 350 for communicating over the IP network 305 with the site applications 345 located in a simulated site 340 on the site server 320. In general, any number of subscriber units 350 may be generated by the subscriber unit server 325, wherein each subscriber unit 350 corresponds to one or more IP addresses to allow for communication over the IP network 305. Because the IP network 305 provides an IP-based interface between the components of the system 300, communication between components such as, for example, simulated subscriber units 350 and site applications 345, may be provided by transmitting and receiving data to and from the IP addresses associated with the communicating components.

Figure 4:
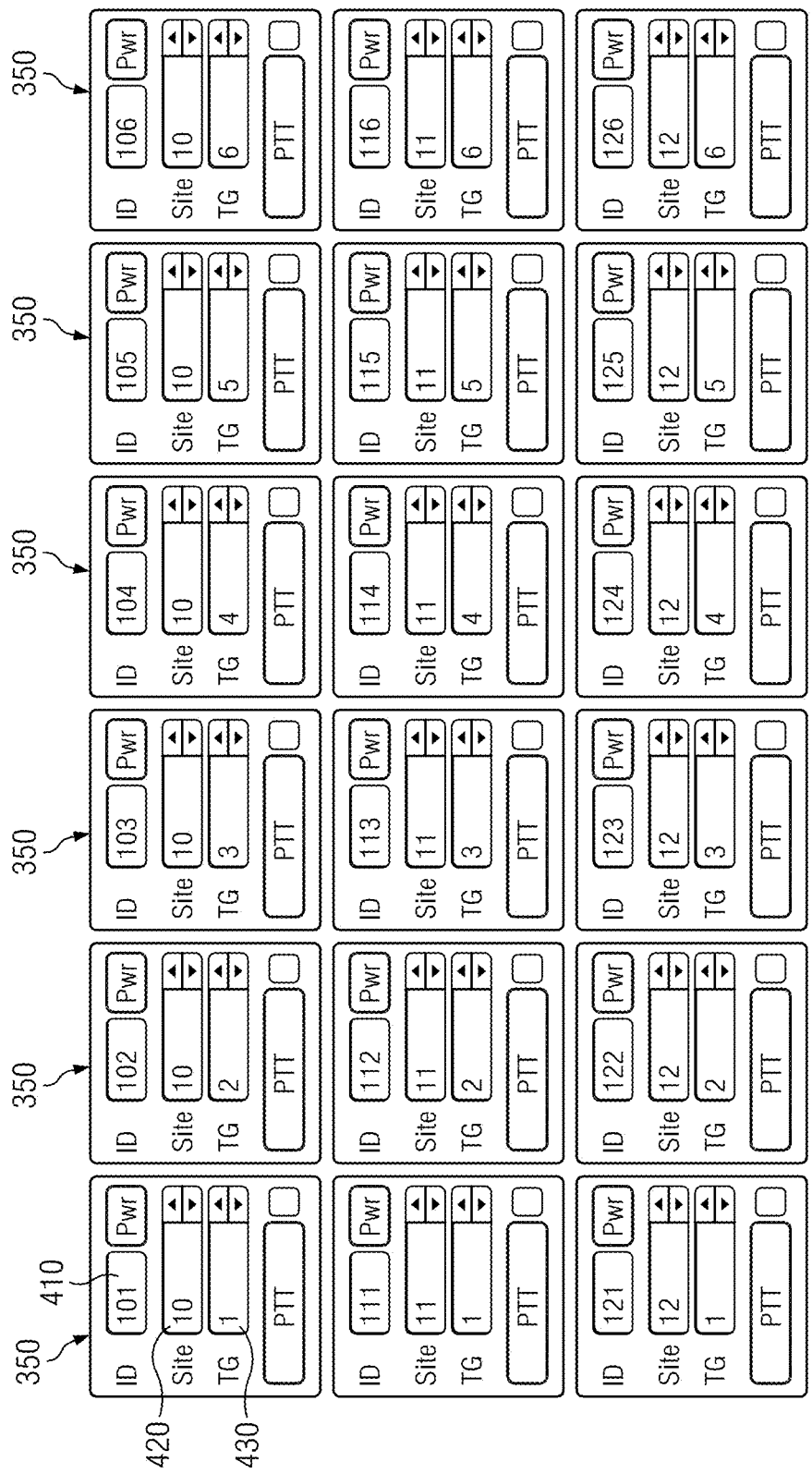
FIG. 4 is an illustration of data associated with a listing of subscriber units simulated by the subscriber unit server shown in FIG. 3.

FIG. 4 is provided in combination with FIG. 3 and the text below to describe an example of communication between a first simulated subscriber unit 350 and one or more site applications 345 in accordance with the disclosure provided herein. Accordingly, FIG. 4 illustrates multiple example simulated subscriber units 350 each associated with an IP address within the subscriber unit server 325, wherein each simulated subscriber unit 350 is represented by a simulated subscriber unit ID 410. Each simulated subscriber unit 350 also includes (i) a site ID 420 indicating the simulated site 340 for which the example simulated subscriber unit 350 is registered, and (ii) a talkgroup ID 430 indicating the talkgroup to which the specific simulated subscriber unit 350 is affiliated.

In one example illustrating communication between components of the system 300, a first simulated subscriber unit 350 initiates a group call, and the subscriber unit server 325 simulates a push-to-talk (PTT) request originating from the first simulated subscriber unit 350 initiating the call. The PTT request is sent over the IP network 305 to the site server 320 where it is received at the control channel application 345A of the simulated site 340 for which the first simulated subscriber unit 350 is registered. The control channel 345A then performs typical call setup functions performed by traditional, non-simulated LMR sites.

Examples of call setup functions performed by traditional, non-simulated LMR sites may include those provided in U.S. patent application Ser. Nos. 13/174,507 and 13/210, 211, entitled "System and Method for Providing Mobility Management and Out-of-Coverage Indication in a Conventional Land Mobile Radio System," and "Hybrid Land Mobile Radio System Incorporating Mobility Management and Out-of-Coverage Indication," respectively, both hereby incorporated by reference for all purposes, wherein, as mentioned above, components identified by an RF or physical location in traditional, non-simulated LMR systems are identified by an IP address in the system 300 provided by the present disclosure. For example, in response to the PTT request, the control channel application 345A may request validation of the first simulated subscriber unit 350 from the site controller application 345B as well as allocation of a traffic channel 345C to conduct the call.

Additionally, the control channel 345A may receive information that may identify the IP addresses of the site controller applications 345B of the simulated sites 340 at which other simulated subscriber units 350 affiliated with the talkgroup of the call are registered. The control channel 345A may then transmit information identifying the IP addresses of the site controllers 345B as well as the IP address of the traffic channel 345C allocated by the site controller 345B over the IP network 305 to the first simulated subscriber unit 350 initiating the call.

In accordance with the current example, when the first simulated subscriber unit 350 receives, from the control channel 345A, information identifying the IP address of the traffic channel 345C, the subscriber unit server 325 transmits call data (e.g., voice packets, or voice data) over the IP network 305 to the traffic channel 345C allocated by the site controller 345B. The traffic channel 345C allocated to conduct the call from the first subscriber unit 350 then transmits the call data to the site controllers 345B of the sites 340 with which the other simulated subscriber units 350 affiliated with the talkgroup of the call are registered. Finally, the simulated site 340 transmits the call data over the IP network 305 to the simulated subscriber units 350 receiving the call, where it is received at each respective simulated subscriber unit 350 registered with the talkgroup of the call. It should be understood that, in some embodiments, the subscriber unit server 325 may directly transmit call data over the IP network 305 to the site controllers 345B of the sites 340 at which other simulated subscriber units 350 affiliated with the talkgroup of the call are registered.

The above example is provided to illustrate communication between components of the system 300. Although the above example illustrates communication using call data, it should be appreciated that any type of data may be communicated using the simulation system 300 including, for example, mobility data, registration data, location data, global positioning system (GPS) information, or any other data transmitted by a radio unit. It should be understood that the tasks performed by the applications 345 may be simulated by the site server 320. Similarly, tasks performed by subscriber units 350 may be simulated by the subscriber unit server 325. In accordance with the present disclosure, it should be understood that a component in the system 300 may simulate a task, feature, system, application, etc. . . . by generating and/or running code designed to execute the simulated task, feature, system, application, etc. Additionally, as used in the present disclosure, it should be understood that a traditional, non-simulated LMR system includes not only trunking LMR systems, but also hybrid LMR systems.

Components in the present disclosure may provide functionality similar to that provided by their counterparts located in a traditional, non-simulated LMR system, except that the components in the present disclosure that are typically identified by an RF or physical location in traditional, non-simulated LMR systems are now identified by an IP address in the system provided by the present disclosure. For example, a control channel application may be operable to communicate one or more control channel messages in accordance with Telecommunications Industry Association standards such as, for example, TIA-102.AABC. Examples of such control channel messages may include: call set-up, registration and talkgroup affiliation, RFSS status, network status, radio control, adjacent site information and registration, affiliation, and deregulation responses.

Referring again to FIG. 3, the system 300 may also include a controller 330 operable to provide an interface between components of the simulation system 300, thereby acting as a platform for allowing user interaction with the simulation system 300 such that the user can control and/or monitor features and operation of the simulation system 300. For example, in some embodiments, the controller 330 may allow the user to, among other things, a) determine the number of subscriber units 350 to be simulated by the subscriber unit server 325, b) enter and/or edit a subscriber unit's site affiliation, talkgroup, location, or other data associated with each simulated subscriber unit 350, c) run scripts to perform an operation within the LMR system (e.g., initiate a PTT, create an emergency alarm, initiate an emergency call, etc.), d) provide other interaction to setup, operate, and/or monitor the system 300 to simulate a LMR system, and e) generate voice data for transmitting across the IP network 305, wherein said voice data may be canned voice data provided to the controller 330 by the user, or artificial voice data generated by the site server 320 or subscriber unit server 325. In some embodiments, the controller 330 may also allow a user to test and debug an LMR system having simulated sites and/or traditional, non-simulated land mobile radio sites.

Figure 5:
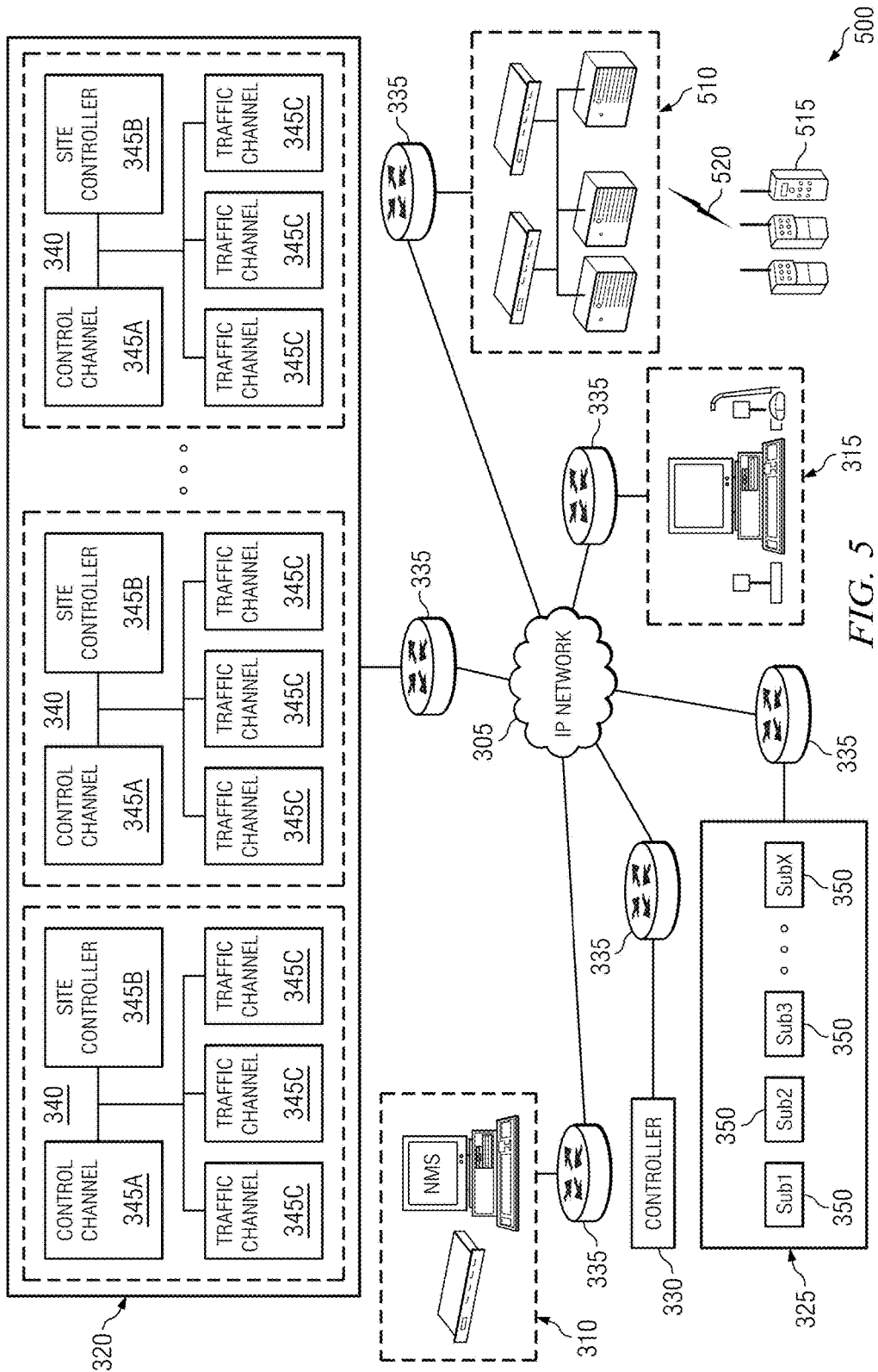
FIG. 5 is an illustration of an example embodiment of a system for simulating an LMR system.

FIG. 5 illustrates another example embodiment of the present disclosure, similar to the system 300 illustrated in FIG. 3 and described above, except that the simulation system 500 in FIG. 5 combines the above system 300 with one or more non-simulated LMR sites 510 connected to the other components in the system 500 through the IP network 305. The non-simulated sites 510 communicate with non-simulated subscriber units 515 over an RF interface 520. In some embodiments, the controller 330 may be adapted to provide a diagnostic and testing interface for the system 500 illustrated in FIG. 5.

In some embodiments, the system 500 may be used to test the capacity of a pre-existing LMR system implementing non-simulated LMR sites 510 by adapting the pre-existing LMR system to incorporate the system 500 illustrated in FIG. 5, and then simulating additional communication over the existing LMR system to determine the pre-existing LMR system's capacity and limitations. For example, in one embodiment, a site server 320 may be in communication with an existing LMR site 510 to run diagnostics and test the existing LMR site 510 or the LMR system to which the LMR site 510 is associated. In this embodiment, the system 500 of FIG. 5 may be implemented to determine the capacity and/or limitations of an existing LMR site 510 by simulating communication over the existing LMR site 510 and/or the LMR system of the site 510.

Figure 6:
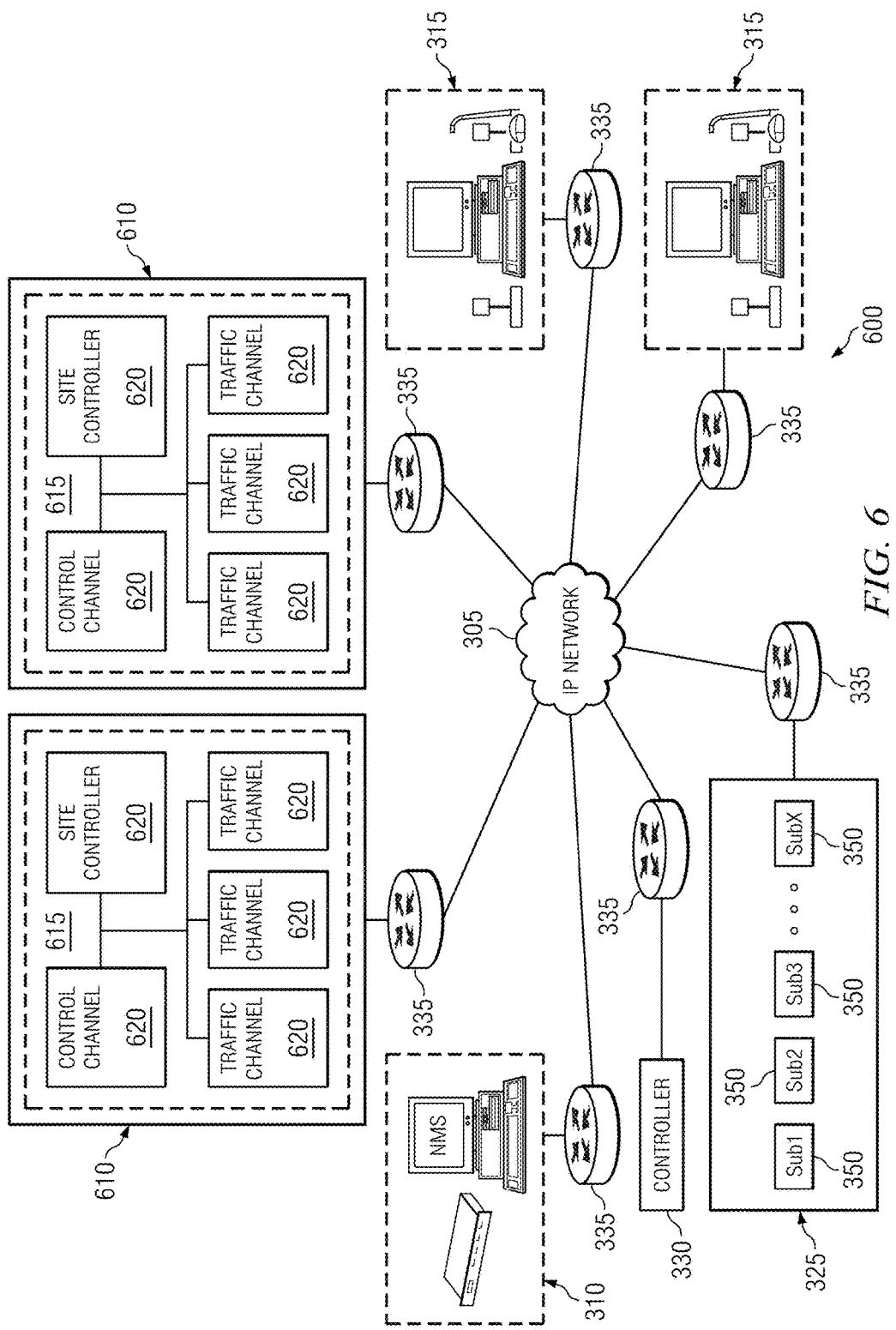
FIG. 6 is an illustration of an example of another embodiment of a system for simulating an LMR system.

FIG. 6 illustrates another example embodiment of the present disclosure, similar to the system 300 illustrated in FIG. 3 and described above, except that the simulation system 600 in FIG. 6 replaces the single site server 320 in FIG. 3 with one or more site servers 610 each operable to simulate one or more sites 615, wherein each site 615 comprises one or more site applications 620 associated with an IP address.

Figure 7:
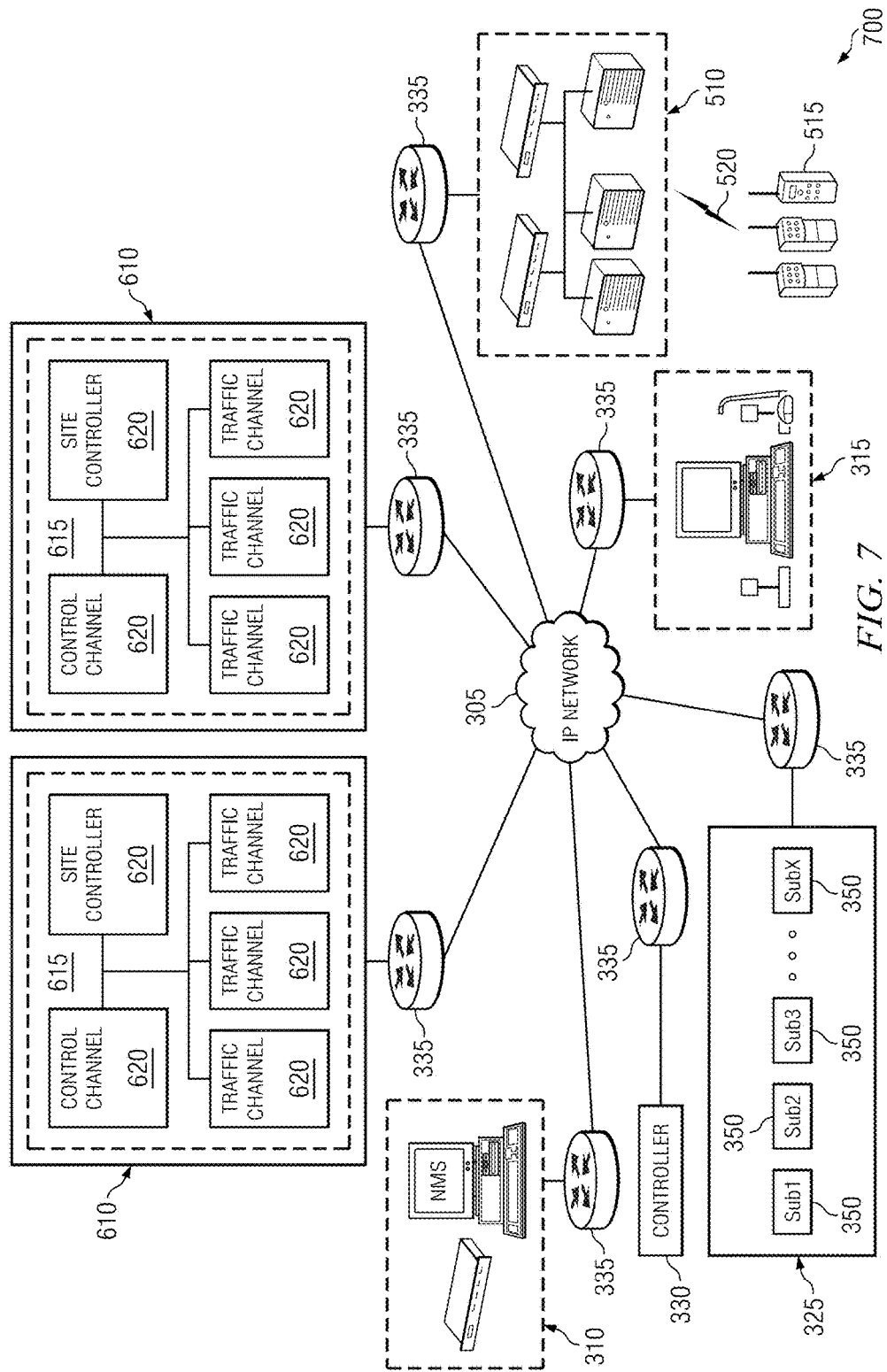
FIG. 7 is an illustration of an example of yet another embodiment of a system for simulating an LMR system.

FIG. 7 illustrates another example embodiment of the present disclosure, similar to those illustrated in FIGS. 3, 5, and 6 and described above. The system 700 illustrated in FIG. 7 incorporates the system 300 as described in accordance with FIG. 3, wherein the system 700 also incorporates the one or more site servers 610 of FIG. 6, and the one or more non-simulated LMR sites 510 of FIG. 5 connected through the IP network 305. Accordingly, the one or more site servers 610 each simulate one or more sites 615, wherein each site 615 comprises one or more site applications 620 associated with an IP address. Additionally, the non-simulated LMR site 510 communicates with non-simulated subscriber units 515 over an RF interface 520. In an embodiment of the present disclosure, the controller 330 may be adapted to provide a diagnostic and testing interface for the system 700, wherein the system 700 may be used to test the capacity of a pre-existing LMR system implementing non-simulated LMR sites 510 by adapting the pre-existing LMR system to incorporate the system 700 illustrated in FIG. 7, and then simulating additional communication over the existing LMR system to determine the LMR system's capacity and limitations. In one embodiment, a site server 610 may be connected to an existing LMR site to run diagnostics and test the existing LMR site or LMR system. For example, the system 700 of FIG. 7 may be implemented to determine an existing LMR site's capacity and/or limitations by simulating communication over the existing LMR site and/or LMR system. In the example embodiments described above, the existing LMR site may be represented by the non-simulated LMR site 510 illustrated in the system 700 of FIG. 7.

The figures and accompanying text are provided herein to disclose one or more aspects or embodiments and/or to provide one or more examples of one or more systems and methods for simulating an LMR system. The simulation systems may be implemented in a controlled testing environment, or even in an existing LMR system, to provide efficient, dynamic testing of an LMR system. The examples and example embodiments provided herein are not intended to limit the scope or spirit of the present disclosure as defined in the claims provided below.

What is claimed is:

1. A method for simulating a land mobile radio system having a plurality of radio sites, the method comprising:
    simulating, by a first server, one or more land mobile radio sites;
    simulating, by a second server, one or more simulated subscriber units in communication with at least one of the one or more simulated land mobile radio sites and one or more non-simulated land mobile radio site of the land mobile radio system; and
    wherein the first server and the second server are connected to an IP network comprising an IP-based interface between the first server and the second server configured to communicate data packets between the first server and the second server that simulate radio signals among at least two of: the one or more simulated land mobile radio site, the one or more non-simulated land mobile radio site, the one or more simulated subscriber unit, and a one or more non-simulated subscriber unit;

wherein each simulated land mobile radio site comprises:
an application layer comprising one or more simulated land mobile radio site applications, each simulated land mobile radio site application having and uniquely addressed by at least one unique simulated land mobile radio site application IP address on the IP network, such that a plurality of unique simulated land mobile radio site application IP addresses are associated with the first server to address the one or more simulated land mobile radio site applications;
wherein the one or more simulated land mobile radio site applications comprises at least a control channel application addressed by the unique simulated land mobile radio site application IP address comprising a unique land mobile radio site control channel application IP address and the land mobile radio site controller application addressed by the unique simulated land mobile radio site application IP address comprising a unique land mobile radio site controller application IP address,
wherein the application layer communicates data packets simulating radio signals from the one or more simulated land mobile radio site applications to at least one of: the one or more non-simulated land mobile radio site, the one or more simulated land mobile radio site, the one or more non-simulated subscriber unit, and the one or more simulated subscriber unit,
wherein the one or more non-simulated land mobile radio site is in communication with at least one non-simulated subscriber unit by the radio signals different than the data packets;
wherein the first server and the second server simulate additional communication over the radio signals by generating and communicating data packets over the IP network between at least two of: the first server, the second server, at least one of the one or more non-simulated land mobile radio site, at least one of the one or more simulated land mobile radio site, at least one of the one or more non-simulated subscriber unit, and at least one of the one or more simulated subscriber unit, wherein the data packets simulate the radio signals, and
wherein the first server and the second server simulate a radio call wherein the control channel application is in communication with a first of the one or more simulated subscriber units initiating the call, the communication comprising providing both the unique land mobile radio site control channel IP address and the unique land mobile radio site controller application IP address to the first of the one or more simulated subscriber units initiating the call via the IP network,
wherein the first of the one or more simulated subscriber units provides call data to both the unique land mobile radio site control channel IP address and the unique land mobile radio site controller application IP address,
wherein the land mobile radio site controller application transmits at least a portion of the call data to further land mobile radio site controller applications of further simulated land mobile radio site having a same talkgroup IP as the first of the one or more simulated subscriber units for retransmission to further simulated subscriber units.

2. The method for simulating the land mobile radio system as set forth in claim 1, further comprising:
simulating radio site channel allocation with one or more of the simulated subscriber units associated with a unique subscriber unit IP address;
controlling operation of the one or more simulated subscriber units; and
configuring the simulated land mobile radio system.

3. The method for simulating the land mobile radio system as set forth in claim 1, further comprising performing diagnostic testing of the simulated land mobile radio system.

4. The method for simulating the land mobile radio system as set forth in claim 1, further comprising configuring at least one of the one or more non-simulated land mobile radio sites.

5. The method for simulating the land mobile radio system as set forth in claim 1, further comprising performing diagnostic testing of at least one of the one or more non-simulated land mobile radio sites.

6. The method for simulating the land mobile radio system as set forth in claim 1, wherein the land mobile radio site controller application is configured to simulate one or more tasks from the group consisting of call routing, channel allocation, subscriber unit validation, site controller redundancy control, talkgroup affiliation validation, unit call validation, emergency call validation, emergency alarm management, group call resource arrangement, subscriber management, inhibiting subscriber units, dynamically regrouping subscriber units, selector locking subscriber units, requesting subscriber unit reregistration, and mobility management.

7. The method for simulating the land mobile radio system as set forth in claim 1, wherein the control channel application is configured to simulate at least one or more control channel messages.

8. The method for simulating the land mobile radio system as set forth in claim 1, wherein a simulated traffic channel application is configured to simulate communication between a simulated traffic channel and one or more of the simulated subscriber units.

9. A system for simulating a land mobile radio system having a plurality of land mobile radio sites, the system comprising:
a first server configured to simulate one or more land mobile radio sites;
a second server configured to simulate one or more simulated subscriber units,
wherein each one or more simulated subscriber unit is associated with a respective unique subscriber unit IP address, a simulated subscriber unit ID, a talk group ID indicating to which of one or more talkgroup the simulated subscriber unit is affiliated, and a site ID indicating to which of the one or more land mobile radio sites the simulated subscriber unit is registered,
wherein each one or more simulated subscriber unit is in communication with at least one of the one or more simulated land mobile radio sites corresponding to the site ID of the simulated subscriber unit and one or more non-simulated land mobile radio site of the land mobile radio system; and
an IP network comprising an IP-based interface between the first server and the second server configured to communicate data packets between the first server and the second server that simulate radio signals among at least two of: the one or more simulated land mobile radio site, the one or more non-simulated land mobile radio site, the one or more simulated subscriber unit each associated with the respective unique subscriber unit IP address, and a one or more non-simulated subscriber unit;
wherein each simulated land mobile radio site comprises:

an application layer comprising one or more simulated land mobile radio site applications, each simulated land mobile radio site application having and uniquely addressed by at least one unique simulated land mobile radio site application IP address on an IP network, such that a plurality of unique IP addresses are associated with the first server to address the one or more simulated land mobile radio site applications;

wherein the application layer communicates data packets simulating radio signals from the one or more simulated land mobile radio site applications to at least one of: the one or more non-simulated land mobile radio site, the one or more simulated land mobile radio site, the one or more non-simulated subscriber unit, and the one or more simulated subscriber unit, wherein the one or more non-simulated land mobile radio site is in communication with at least one non-simulated subscriber unit by the radio signals different than the data packets;

wherein the first server and the second server simulate additional communication over the radio signals by generating and communicating data packets over the IP network between at least two of: the first server, the second server, the non-simulated land mobile radio site, the simulated land mobile radio site, the non-simulated subscriber unit, and the simulated subscriber unit, wherein the data packets simulate the radio signals, wherein the one or more simulated land mobile radio site applications addressed by at least one unique land mobile radio site application IP address comprises a control channel application associated with a site controller of the simulated land mobile radio site, wherein the control channel application transmits both the unique land mobile radio site application IP address of the control channel application and a simulated land mobile radio site IP address associated with the simulated land mobile radio site having the site controller to a first of the one or more simulated subscriber unit in response to the first of the one or more simulated subscriber units initiating a call, wherein the first of the one or more simulated subscriber unit transmits call data to the unique land mobile radio site application IP address of the control channel application and to the unique simulated land mobile radio site IP address associated with the simulated land mobile radio site having the site controller, and wherein the simulated land mobile radio site having the site controller transmits at least a portion of the call data to further site controllers of further simulated land mobile radio sites having a same talkgroup IP as the first of the one or more simulated subscriber units for retransmission to further simulated subscriber units.

10. The system for simulating the land mobile radio system as set forth in claim 9, wherein the second server is configured to communicate data between at least one simulated subscriber unit and at least one simulated land mobile radio site application using the IP-based interface.

11. The system for simulating the land mobile radio system as set forth in claim 9, wherein the site controller of the simulated land mobile radio site comprises a land mobile radio site controller application configured to simulate one or more tasks from the group consisting of: call routing, channel allocation, subscriber unit validation, site controller redundancy control, talkgroup affiliation validation, group call validation, unit call validation, emergency call validation, emergency alarm management, subscriber management, inhibiting subscriber units, dynamically regrouping subscriber units, selector locking subscriber units, requesting subscriber unit reregistration, and mobility management.

12. The system for simulating the land mobile radio system as set forth in claim 9, wherein the control channel application is configured to communicate at least one or more control channel messages.

13. The system for simulating the land mobile radio system as set forth in claim 9, wherein a simulated traffic channel application is configured to communicate voice data with one or more of the simulated subscriber units.

14. The system for simulating the land mobile radio system as set forth in claim 9, wherein the second server is configured to transfer voice data over the IP network from one or more of the simulated subscriber units to one or more of the simulated land mobile radio site application IP addresses.

15. The system for simulating the land mobile radio system as set forth in claim 14, wherein the voice data is generated by the second server.

16. The system for simulating the land mobile radio system as set forth in claim 14, further comprising a user interface controlling operation of at least one of the first server and the second server, and
wherein the voice data is generated using the user interface.

17. The system for simulating the land mobile radio system as set forth in claim 9, wherein the first server is further configured to generate voice data.

18. The system for simulating the land mobile radio system as set forth in claim 9, further comprising a user interface controlling operation of at least one of the first server and the second server, and
wherein the user interface is further configured to control one or more of the simulated subscriber units.

19. The system for simulating the land mobile radio system as set forth in claim 9, wherein at least one simulated subscriber unit is associated with at least one of the simulated land mobile radio sites.

20. The system for simulating the land mobile radio system as set forth in claim 9, further comprising a user interface controlling operation of at least one of the first server and the second server, and
wherein the user interface is further configured to provide diagnostic testing of the system.

21. The system for simulating the land mobile radio system as set forth in claim 9, further comprising a user interface controlling operation of at least one of the first server and the second server, and
wherein the user interface is further configured to control diagnostic testing of at least one of: the one or more non-simulated land mobile radio sites, and the one or more non-simulated radios.

22. The system for simulating the land mobile radio system as set forth in claim 9, further comprising a user interface controlling operation of at least one of the first server and the second server, and
wherein the user interface is further configured to configure at least one of: the one or more non-simulated land mobile radio sites, and the one or more non-simulated radios.

23. The system for simulating the land mobile radio system as set forth in claim 9, further comprising:
one or more network management systems; and
one or more dispatch consoles;

wherein the IP network is further configured to provide an IP-based interface between the first server, the second server, the one or more network management systems, and the one or more dispatch consoles.

24. A system for simulating a land mobile radio system, the system comprising:
one or more server configured to simulate one or more simulated subscriber units in communication with at least one or more simulated land mobile radio site of the land mobile radio system; and
an IP network comprising an IP-based interface configured to communicate data packets that simulate radio signals among at least two of: the one or more simulated land mobile radio site, the one or more non-simulated land mobile radio site, the one or more simulated subscriber unit, and a one or more non-simulated subscriber unit;
wherein each simulated land mobile radio site comprises:
an application layer comprising one or more simulated land mobile radio site applications, each simulated land mobile radio site application having and uniquely addressed by at least one unique simulated land mobile radio site application IP address on the IP network, such that a plurality of unique simulated land mobile radio site application IP addresses are associated with the simulated land mobile radio site to address the one or more simulated land mobile radio site applications;
wherein the one or more simulated land mobile radio site applications comprises at least a control channel application addressed by the unique simulated land mobile radio site application IP address comprising a unique land mobile radio site control channel application IP address, and a land mobile radio site controller application addressed by the unique simulated land mobile radio site application IP address comprising a unique land mobile radio site controller application IP address,
wherein the application layer communicates data packets simulating radio signals from the one or more simulated land mobile radio site applications to at least one of: the one or more non-simulated land mobile radio site, the one or more simulated land mobile radio site, the one or more non-simulated subscriber unit, and the one or more simulated subscriber unit,
wherein the one or more non-simulated land mobile radio site is in communication with at least one non-simulated subscriber unit by the radio signals different than the data packets;
wherein the one or more server simulates additional communication over the radio signals by generating and communicating data packets over the IP network between at least two of: the one or more server, the one or more non-simulated land mobile radio site, the one or more simulated land mobile radio site, the one or more non-simulated subscriber unit, and the one or more simulated subscriber unit, wherein the data packets simulate the radio signals, and
wherein the one or more servers simulates a radio call wherein the control channel application is in communication with a first of the one or more simulated subscriber units initiating the call, the communication comprising providing both the unique land mobile radio site control channel IP address and the unique land mobile radio site controller application IP address to the first of the one or more simulated subscriber units initiating the call via the IP network,
wherein the first of the one or more simulated subscriber units provides call data to both the unique land mobile radio site control channel IP address and the unique land mobile radio site controller application IP address,
wherein the land mobile radio site controller application transmits at least a portion of the call data to further land mobile radio site controller applications of further simulated land mobile radio sites having a same talkgroup IP as the first of the one or more simulated subscriber units for retransmission to further simulated subscriber units.

25. The system for simulating the land mobile radio system as set forth in claim 24, further comprising a user interface controlling operation of the one or more server, and
wherein the user interface is further configured to provide diagnostic testing of the system.

26. The system for simulating the land mobile radio system as set forth in claim 24, wherein the IP-based interface is configured to provide communication different than the radio signals between at least one simulated subscriber unit and at least one simulated land mobile radio site application.

27. The system for simulating the land mobile radio system as set forth in claim 24, wherein the IP network different than the radio signals is configured to associate at least one simulated subscriber unit with at least one simulated land mobile radio site application.

28. The system for simulating the land mobile radio system as set forth in claim 24, wherein the land mobile radio site controller application is configured to simulate one or more tasks from the group consisting of call routing, channel allocation, subscriber unit validation, site controller redundancy control, talkgroup affiliation validation, group call validation, unit call validation, emergency call validation, emergency alarm management, subscriber management, inhibiting subscriber units, dynamically regrouping subscriber units, selector locking subscriber units, requesting subscriber unit reregistration, and mobility management.

29. The system for simulating the land mobile radio system as set forth in claim 24, wherein the control channel application is configured to simulate at least one or more control channel messages.

30. The system for simulating the land mobile radio system as set forth in claim 24, wherein a simulated traffic channel application is configured to simulate communication between a simulated traffic channel and one or more of the simulated subscriber units.

31. The system for simulating the land mobile radio system as set forth in claim 24, wherein at least one of the one or more server is configured to transfer voice data over the IP network different than the radio signals from one or more of the simulated subscriber units to one or more of the simulated land mobile radio site application IP addresses.

32. The system for simulating the land mobile radio system as set forth in claim 24, further comprising a user interface controlling operation of at least one of the one or more server, and
wherein the user interface is further configured to control one or more simulated subscriber units.

33. The system for simulating the land mobile radio system as set forth in claim 24, further comprising a user interface controlling operation of at least one of the one or more server, and
wherein the user interface is further configured to configure the system.

34. The system for simulating the land mobile radio system as set forth in claim 24, wherein at least one simulated subscriber unit is associated with at least one of the simulated land mobile radio sites.

35. The system for simulating the land mobile radio system as set forth in claim 24, further comprising a user interface controlling operation of at least one of the one or more server, and
   wherein the user interface is further configured to control diagnostic testing of at least one of: the one or more non-simulated land mobile radio sites, and the one or more non-simulated subscriber units.

36. The system for simulating the land mobile radio system as set forth in claim 24, further comprising a user interface controlling operation of at least one of the one or more server, and
   wherein the user interface is further configured to configure at least one of: the one or more non-simulated land mobile radio sites, and the one or more non-simulated subscriber units.

* * * * *